Sept. 25, 1934.                    J. STADLER                      1,974,901
                                 CALCULATOR TOY
                              Filed Aug. 3, 1933          2 Sheets-Sheet 1

INVENTOR
John Stadler
BY
Wooster & Davis
ATTORNEYS

Sept. 25, 1934.   J. STADLER   1,974,901
CALCULATOR TOY
Filed Aug. 3, 1933   2 Sheets-Sheet 2
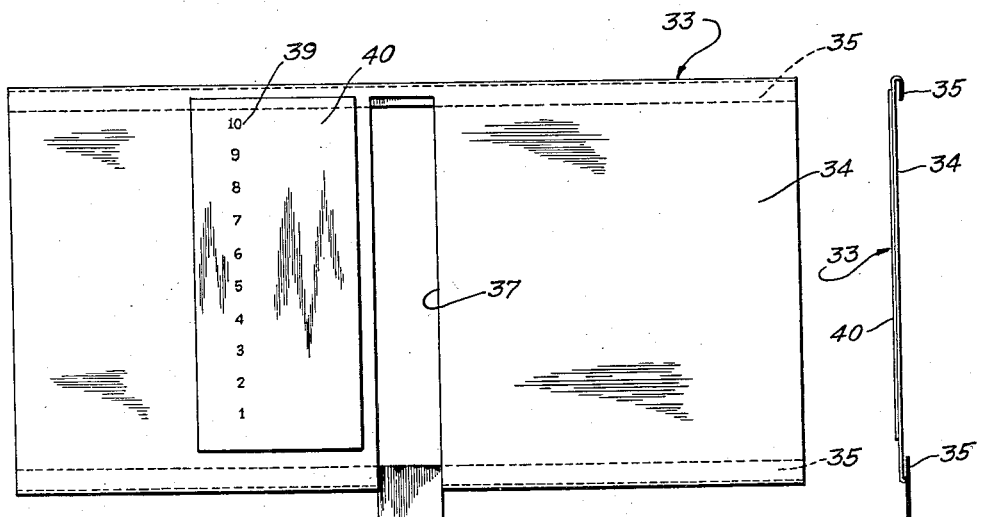
Fig. 5
Fig. 6
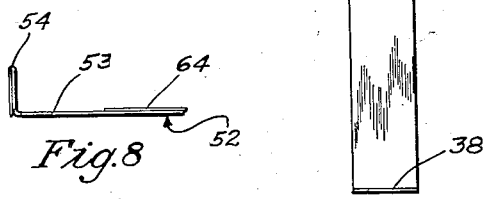
Fig. 8
Fig. 7
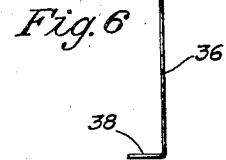
Fig. 9
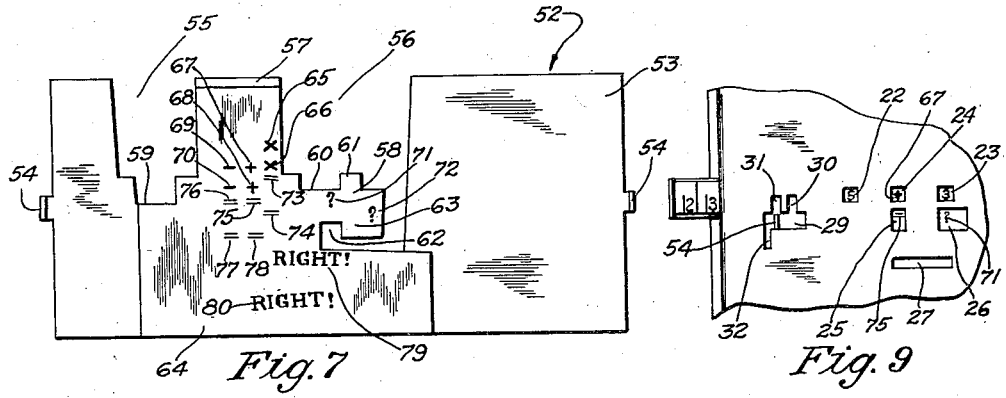
Fig. 11     Fig. 10
INVENTOR
John Stadler
BY Wooster & Davis
ATTORNEYS.

Patented Sept. 25, 1934

1,974,901

UNITED STATES PATENT OFFICE 1,974,901

CALCULATOR TOY

John Stadler, Bridgeport, Conn.

Application August 3, 1933, Serial No. 683,453

16 Claims. (Cl. 35—2)

This invention relates to new and useful improvements in calculators and has for an object to provide a calculator particularly adapted for use by a child and which will on proper manipulation give the child a clearly presented mathematical question, and on further slight manipulation give clearly the answer to the question whereby the answer determined mentally by the child may be compared with the correct answer.

Another object is to provide a calculator which may be easily and quickly operated to give an answer to a problem in addition, subtraction or multiplication.

A further object is to provide a calculator as stated and which is of simple construction involving but a relatively few parts whereby it may be manufactured at low cost.

Other objects and advantages will become apparent from a consideration of the following detailed description taken in connection with the accompanying drawings wherein a satisfactory embodiment of the invention is shown. However, it will be understood that the invention is not limited to the details disclosed but includes all such variations and modifications as fall within the spirit of the invention and the scope of the appended claims.

In the drawings:

Fig. 5 is a plan view of a frame within which the slide is mounted when the calculator is in use;

Fig. 6 is an edge view of said frame;

Fig. 7 is a plan view of a plate employed;

Fig. 8 is an edge view showing a portion of said plate;

Fig. 9 is a detail plan view showing a portion of the assembled calculator with the parts positioned to give the question "5+3=?";

Fig. 10 is a similar view but showing the parts positioned to give the answer to the question of Fig. 9; and Fig. 11 is a similar view with the parts positioned to show the answer to a problem in subtraction.

Figures 1, 2, 3, 4:
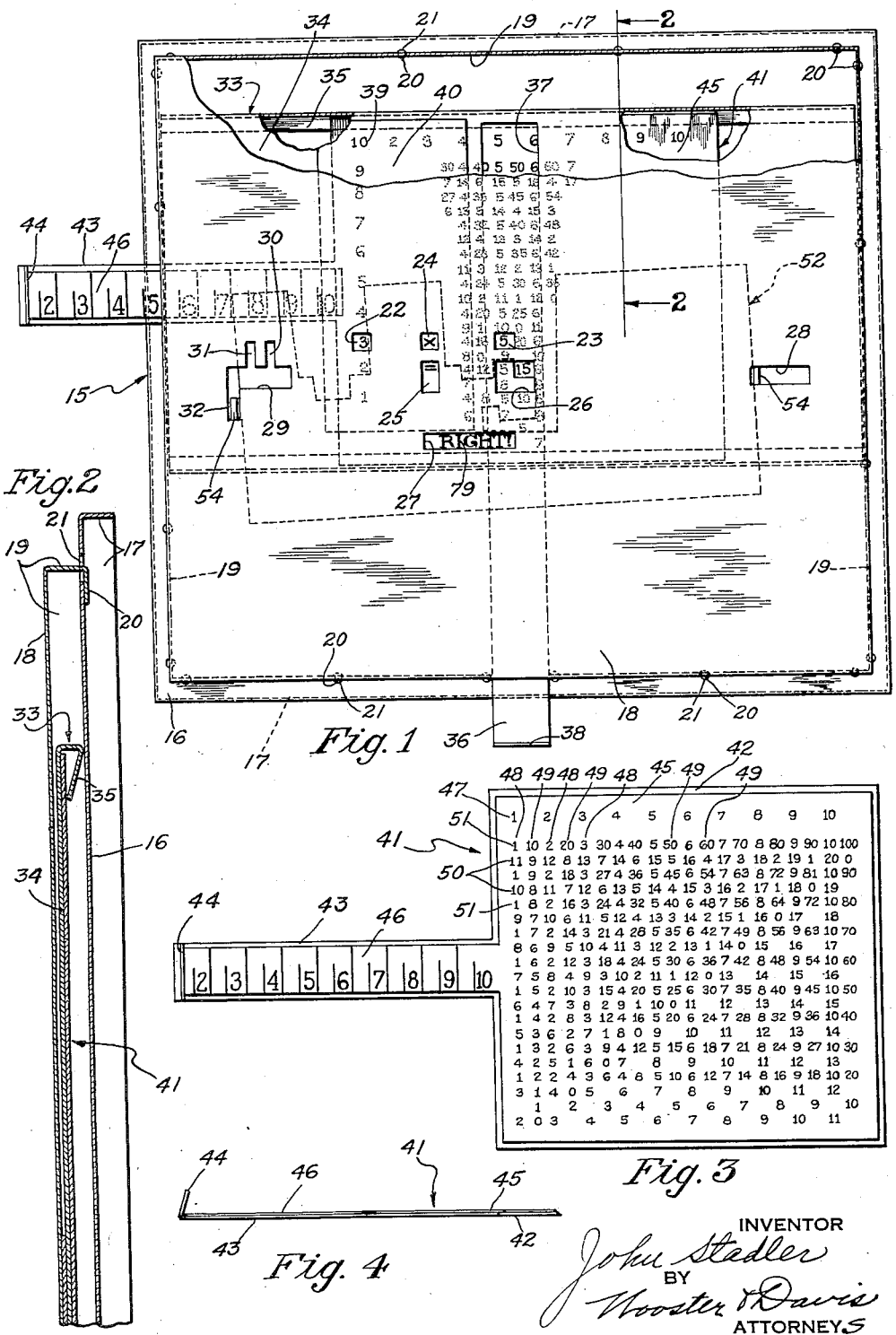
Fig. 1 is a face view of the complete calculator with the parts positioned to show the answer to the problem "3×5", portions of the calculator being broken away to show interior construction.
Fig. 2 is a detail sectional view taken substantially along the line 2—2 of Fig. 1, the view being on an enlarged scale.
Fig. 3 is a plan view of a slide employed.
Fig. 4 is an edge view of a portion of said slide.

Referring in detail to the drawings, the improved calculator as there shown includes a casing 15 comprising a base or mounting portion 16 which is shown as being generally rectangular in plan and which has its edge portions downturned to provide a flange 17 extending entirely about the edge of the base. Mounted on the base 16 is a casing cover member or upper member 18 also generally rectangular in plan and slightly smaller than the base and this upper or cover member 18 has its edge portions downturned providing flanges 19 which at spaced points carry lugs 20 which pass through openings 21 in the base or mounting portion and are then clenched over to secure the base and cover members or portions together in a manner to provide a hollow casing.

The cover member 18 forms the front or outer wall of the casing 15 and such front wall of the casing is provided with a plurality of windows or openings through which the various parts within the casing may be visible or made effective. While certain of said openings or windows are of the same size and shape each opening or window is given a separate reference numeral in order that the operation of the calculator may be more clearly given in subsequent portions of the description.

As here disclosed, the front wall of the casing is provided with spaced similar openings or windows 22 and 23 through which are to be shown operating numerals as will later be described. These operating numerals represent the numerals which are to be added, subtracted or multiplied as the case may be. Intermediate the windows 22 and 23 is a window 24 through which is to be shown a sign or symbol designating the type of problem to be solved. That is, through the window 24 will be shown as desired either the addition, subtraction or multiplication symbol or sign.

Below the window 24 is a somewhat elongated window or opening 25 through which is to be shown the mathematical symbol representing "equals". Opposite window 25 and below the window 23 is a window 26 of substantially four times the area of the window 23 and when the calculator is operated the results or answers to the various problems will be made visible through this window 26 and when the calculator is operated to give only a question and before it is operated to give the answer the parts may be arranged to have a question mark displayed through the window 26.

A window or opening 27 may be provided and through which the word "Right" or "Correct" may be shown when the parts are manipulated to give the answer to a problem. As here disclosed this window 27 is below the windows 25 and 26 although obviously it may be arranged in some other relation. Toward the edges of the casing the cover is provided with elongated openings 28 and 29 which form guides and through which operating portions or lugs extend for manipulation as will later be more fully set forth. Here, however, it will be noted that spaced slots 30, 31 and 32 enter or communicate with the slot 29 and the function of the slots 30, 31 and 32 will later be described.

Within the casing there is arranged a frame generally designated 33 and including a plate-like body portion 34 the upper and lower edge portions of which are inturned providing guide flanges 35. Intermediate its ends, the body portion 34 is lanced and a handle-like strip 36 is pressed therefrom providing the said body portion with a transversely extending slot 37. The outer end of the handle or manipulating portion 36 may be up-turned as at 38 so as to be easily accessible for manipulation of the frame 33.

As disclosed, the frame 33 is of a length equal to the distance between a pair of opposite side flanges 19 of the cover member 18 and when the frame is within the casing it is held against lateral movement by these flanges but may be shifted upwardly and downwardly by the handle portion 36. When the frame is in its uppermost position the upturned end 38 of the handle will preferably abut the outer surface of one of the flanges 19 of the cover member and extend slightly above the same to be easily accessible.

In spaced relation to the slot 27 the frame 33 carries a vertically disposed row of operating numerals 39 which numerals are arranged in consecutive order beginning with one (1) and ending with ten (10). In the drawings the numerals 39 are shown as printed on a separate sheet or piece 40 which is glued or otherwise secured to the frame. It will be understood that the frame may be made of any suitable material as sheet metal, celluloid or the like, and that the operating numerals 39 may be printed or otherwise formed directly on or in the frame or that they may be applied to the same as shown in the drawings and as above described.

A slide 41 is mounted in the frame 33 being held in said frame between the body 34 and the flanges 35 thereof and the slide is adapted for movement relative to the frame in a direction longitudinally thereof and transversely of the slot 37 therein. In other words, as the frame is manipulated up and down in the casing it carries the slide 41 with it and in addition to this movement the slide is adapted for movement relative to the frame. Slide 41 comprises essentially a flat plate-like body portion 42 from one edge of which extends a hand piece 43 the other end of which is upturned as at 44 to function as the upturned portion 38 above described. A chart is disposed on the body portion 42 of the slide and as shown in the drawings this chart is printed on a sheet of paper 45 which is glued or otherwise secured to the slide. An extension of the chart may be carried on to the hand piece 43 and this extension is designated 46 and is suitably graduated showing the numerals from "2" to "10". If desired the hand piece 36 of the frame may be similarly graduated.

The chart 45 includes an upper row of numerals 47 beginning with "1" and ending with "10" and below such row are series of horizontal and vertical rows of numerals. Considering first the numerals as arranged in vertical rows it will be noted that alternate rows which are designated 48 are arranged below the numerals of the row 47 and that alternate numerals of these rows 48 comprise operating numerals. That is considering the row 48 it will be noted that the first numeral is "1" and that each alternate numeral of that row is likewise "1" to a point substantially at the end of a row. This same rule holds true in the other rows 48. The alternate vertical rows 49 give the answer or result numbers. Referring to the horizontal rows it is noted that the alternate horizontal rows 50 give the result numbers while the alternate horizontal rows 51 give alternately operating and result numbers.

When the frame 33 and slide 41 are assembled in the casing, the operating numerals 39 are so arranged that on movement of the frame any desired one of said numerals may be brought opposite the window 22 to be visible therethrough. With one of the numerals 39 opposite the window 22, slide 41 may be shifted to bring one of its operating numerals opposite the window 23. Of course, the operating numerals of the slide, which is brought opposite the window 23, will be in the slot 37 so as to be visible through the window 23 and such numeral of the slide will necessarily, according to the present arrangement, be in a horizontal row in alignment with the selected operating numeral of the vertical row 39. The hand pieces 36 and 43 of the frame and slide respectively are disclosed as operating through side edges or flanges of the casing at right angles to each other and while the slide is being operated, the numerals or graduations on its hand piece 43 may be watched to properly locate the slide so as to show the desired numeral through the window 23.

Within the casing 15 and on the upper side of the slotted portion 34 of the frame 33, there is arranged a plate 52 including a body portion 53 the opposite end edges of which carry upwardly extending guide and finger portions 54 of which one may be doubled back on itself as clearly shown in Fig. 8 whereby to give it additional strength. Plate 52 is cut away as at 55 and 56 whereby the plate includes an intermediate portion or arm 57 from one lateral portion of which extends an arm 58. This plate is additionally cut away as at 59 so that the plate will never close the window 22 in any of the various positions into which the plate may be moved. In order that the plate will never close the window 23 the upper edge of the arm 58 of the plate is cut away at 60.

The arm 58 above referred to includes an upwardly extending lug 61 which serves to close a portion of the window 26 when an answer to a problem in multiplication is being exposed at said window. In its lower portion the arm 58 is notched as at 62 and such notch is presented at various portions of the answer window 26 to expose the answers to problems in addition and subtraction, the portion 63 of the arm serving to cooperate with the lug 61 and close off portions of the answer window during the time that the answer to a multiplication problem is being given and this portion 63 further serves with the remainder of the arm 58 to close off a portion of the answer window when an answer to a problem in addition is being given.

A series of mathematical signs and symbols together with any other data desired may be carried by the plate 52 to be exposed through the windows 24, 25 and 27 when the plate is manipulated for that purpose. While such indicia is here shown as carried by a sheet 64 glued or otherwise secured to the plate it will be apparent that the indicia may be printed or otherwise formed directly on or in the plate. On the drawings there are shown two multiplication signs 65 and 66, two addition signs 67 and 68, two subtraction signs 69 and 70, two question marks 71 and 72, six equation signs 73, 74, 75, 76, 77 and 78 and the word "Right" is shown twice at 79 and 80. The use of these various signs and words will later be fully set forth.

When the plate 52 is in place in the casing the upstanding lugs or projections 54 of said plate project through the slots 28 and 29 in the front wall of the casing. While both of these lugs may, to a limited extent, be used as operating lugs or finger pieces, it is preferred to use the lug in the slot 29 as an operating or finger piece and have the lug in the slot 28 function as a guide and fulcrum member.

Assuming the parts to be completely assembled and in position where no problem is presented and where no solution of a problem is being presented the plate 52 will occupy a position where its lugs 54 are disposed in the right hand end portions of the slots 28 and 29 and the windows 24, 25, 26 and 27 in the front wall of the casing will be closed by the arms 57 and 58 of the plate 52 while the windows 22 and 23 will be opened. Assuming now that the problem "3×5" is to be solved as suggested in Fig. 1 the frame 33 is adjusted to dispose the operating numeral 3 of the row 39 opposite the window 22 and thereafter the slide 41 is adjusted to dispose the operating numeral 5 of the horizontal row 51 which aligns with the numeral 3 of row 39, opposite the window 23. Next, the plate 52 is moved as far as possible to the left and such movement brings the multiplication symbol 66 opposite the window 24 and brings the question mark 72 into position where it is visible through the lower right hand corner of the window 23. This same movement disposes the equals sign 74 opposite the lower portion of window 25 and leaves the window 27 blank.

From this it will be seen that through the various windows will be read the problem "3×5=?". To obtain the answer to the problem it is but necessary to shift the lug 54 of plate 52 downwardly into the slot 32 which as above set forth communicates with the slot 29. This rocking movement of plate 52 brings the multiplication sign 65 opposite the window 24 and brings the equals sign 73 opposite the window 25. This same movement carries the question mark away from the window 26 and shifts the arm 58 of plate 52 into position such that the upper right hand corner of the window is exposed to show the number "15" which, of course, is the correct answer to the problem. The operation is the same for solving other problems in multiplication.

Fig. 9 shows the parts set with the addition sign 67 exposed at the window 24, with the question mark 71 exposed at the window 26 and with the equals sign exposed at the window 25. The frame and slide have been adjusted to show at the windows 22 and 23 respectively the numerals 5 and 3 and the problem presented therefore reads "5+3=?". It will be noted that the operating lug 54 is located in the slot 29 opposite the slot 31. To get the answer to the problem presented it is but necessary to move said lug upwardly into slot 31 and such action shifts the plate 52 to expose the addition sign 68 at the window 24, the equals sign at the window 25 and the answer at the window 26. With the parts in this position the answer is visible through the notch 62 in the arm 58 of plate 52. In addition, the word "Right" or any other desired word or phrase is exposed in the window 27 and in the particular illustration given, that is for problems in addition, the instance 80 of such word is exposed. As will later be apparent this word is also exposed when the answer to a problem in subtraction is given and the word "Right" at 79 is exposed when the answer to a problem in multiplication is given.

When a problem in subtraction, as in Fig. 11, is given the frame 33 and slide 41 are adjusted to show the selected operating numerals at the windows 22 and 23 respectively. Next, the lug 54 is used to shift the plate 52 to proper position and said plate is properly positioned when said lug is opposite the slot 30. With the parts in this position, the question mark 71 is visible in the window 26, the minus sign 69 is visible in the window 24 and the equals sign 76 is visible through the window 25. Now when the operating lug 54 is shifted into the slot 30 the question mark will be shifted out of the window 26 and the answer will be exposed through the notch 62 in the arm 58 of the plate. Further, the minus sign 70 will be shown through the window 24 and the equals sign 77 will be shown through the window 25. Therefore, the complete equation including the answer is given. Also, the word "Right" designated 80 or any other desired word becomes visible through the window 27.

It will be evident the chart 45 can use the numerals 39 and 47 for problems in division with corresponding answers to take the place of either the addition, subtraction or multiplication figures above or it may be added to the chart in addition to these. It is not shown on the drawings as it would merely complicate the showing as it merely requires another set of figures to correspond with the problems of division and merely another slot corresponding to slots 30, 31 and 32 to shift lug 54 into it to get the answer in division.

From the foregoing description it will be apparent that I have provided a calculator including means whereby desired problems or questions of addition, subtraction, multiplication or division may be shown and whereby on slight manipulation, the answers to said problems may also be shown. In solving a problem or in locating the answer to a problem it is merely necessary to properly locate the plate 52 and this is accomplished by moving the operating lug 54 of said plate into the proper one of the slots 30, 31 and 32. To present the question or problem the frame 33 and the slide 41 must, of course, be adjusted to locate the desired operating numerals in the rear of the windows 22 and 23 respectively and when this has been done, plate 52 is shifted to have its operating lug 54 located opposite the desired slot 30, 31 or 32. With the parts in this position the complete question is clearly presented and the question may, of course, be either of multiplication, addition, subtraction or division.

The device comprises but a few parts each of which may be stamped from sheet metal or other suitable material and the parts may be easily and quickly assembled. With the parts properly assembled in the casing there is no danger of any parts becoming lost, and the parts are so constructed that there is little, if any, likelihood of the device getting out of order. As above suggested, it is not necessary that the parts be made of any particular material and it will, of course, be understood that the various numerals, signs, words and the like may be printed on or punched into the parts instead of being applied in the manner disclosed.

The window sections of the cover may be equipped with a magnifying glass to facilitate reading of the numbers.

Having thus set forth the nature of my invention, what I claim is:

1. A calculator comprising a casing having a plurality of windows in a wall thereof, a frame within said casing and having a slot therein in the rear of certain of said windows and a series of numerals spaced from said slot and adapted to be presented one at a time before one of said windows, said frame shiftable in said casing to present a desired one of said series of numerals before said window, a slide in said frame and carrying numbers in predetermined relation and representing operating numerals and results or answers, said slide shiftable in said frame to have a desired operating numeral visible through said slot and one of said certain windows, a plate slidable on said frame in the rear of said wall of the casing, said plate carrying indicia and adapted to be manipulated to show a problem involving the visible numeral on the frame and the visible operating numeral on the slide, and said plate adapted thereafter to be further manipulated to expose through another of said certain windows in the wall of the casing and through said slot that one of said result or answer numbers which is the answer to said problem.

2. A calculator comprising a casing having a plurality of windows in a wall thereof, a frame within said casing and having a slot therein in the rear of certain of said windows and a series of numerals spaced from said slot and adapted to be presented one at a time before one of said windows, said frame shiftable in said casing to present a desired one of said series of numerals before said window, a slide in said frame and carrying numbers in predetermined relation and representing operating numerals and results or answers, said slide shiftable in said frame to have a desired operating numeral visible through said slot and one of said certain windows, a plate slidable and rockable on said frame in the rear of said wall of the casing, said plate carrying indicia and adapted to be slid to a position to show a problem involving the visible numeral on the frame and the visible operating numeral on the slide, and said plate adapted thereafter to be rocked to expose through another of said certain windows in the wall of the casing and through said slot that one of said result or answer numbers which is the answer to said problem.

3. In a calculator, a plate having windows therein, a frame on the rear of said plate and shiftable with respect thereto, means for guiding said frame for movement in a given path, said frame having a slot therein extending in the direction in which the frame may be shifted, a slide in said frame and shiftable relative thereto in a direction transverse to the direction in which the frame may be shifted, said frame and slide carrying indicia visible through said windows in different positions of the frame and slide, and a plate between said frame and said first plate and adapted to be shifted to and from positions closing certain of the windows in the latter.

4. In a calculator, a plate having windows therein, a frame on the rear of said plate and shiftable with respect thereto, means for guiding said frame for movement in a given path, said frame having a slot therein extending in the direction in which the frame may be shifted, a slide in said frame and shiftable relative thereto in a direction transverse to the direction in which the frame may be shifted, said frame and slide carrying indicia visible through said windows in different positons of the frame and slide, a plate between said frame and said first plate, operating means for the second mentioned plate, said operating means extending through the first mentioned plate, and said operating means manipulatable to shift said second mentioned plate to and from positions closing certain of said windows.

5. In a calculator, a plate having windows therein, a frame on the rear of said plate and shiftable with respect thereto, means for guiding said frame for movement in a given path, said frame having a slot therein extending in the direction in which the frame may be shifted, a slide in said frame and shiftable relative thereto in a direction transverse to the direction in which the frame may be shifted, said frame and slide carrying indicia visible through said windows in different positions of the frame and slide, a plate between said frame and said first plate, operating means for the second mentioned plate, said operating means extending through the first mentioned plate and slidably and rockably mounting the second mentioned plate, and said operating means manipulatable to slide and rock said second mentioned plate to and from positions closing certain of said windows.

6. In a calculator, a casing having a window in a wall thereof, a frame shiftable in said casing and having a slot therein, a slide in and shiftable relative to said frame in a direction transverse of said slot to expose portions of the slide through the slot and window, said portions of the slide carrying indicia, and a plate shiftable on said frame over said slot to indicate predetermined portions of said slide through the slot and window.

7. In a calculator, a frame having a slot therein, a slide shiftable in the frame to expose various portions of the slide through said slot, said portions of the slide carrying indicia, and a plate on and slidable and rockable relative to said frame to selectively indicate various portions of the exposed portions of the slide.

8. In a calculator, a casing having windows in its front wall, a frame in said casing and slidable therein, means for guiding said frame for movement in a given path, a hand piece connected with said frame and extending out of said casing, said frame carrying indicia visible through a window in different positions of the frame, a slide in said frame and shiftable therein in a direction transverse to the direction in which the frame is shiftable, said frame having a slot therein whereby various portions of said slide may be exposed through certain of said windows, said portions of the slide carrying indicia, and a hand piece connected with said slide and extending through said casing.

9. In a calculator, a casing having windows in its front wall, a frame in said casing and slidable therein, means for guiding said frame for movement in a given path, a hand piece connected with said frame and extending out of said casing, said frame carrying indicia visible through a window in different positions of the frame, a slide in said frame and shiftable therein in a direction transverse to the direction in which the frame is shiftable, said frame having a slot therein whereby various portions of said slide may be exposed through certain of said windows, said portions of the slide carrying indicia, a hand piece connected with said slide and extending through said casing, a movable plate in said casing on said frame, a hand piece on said plate and extending out of said casing, and said hand piece adapted to be manipulated to shift said plate to and from positions closing certain of said windows.

10. In a calculator, a casing having windows in its front wall, a frame in said casing and slidable therein, means for guiding said frame for movement in a given path, a hand piece connected with said frame and extending out of said casing, said frame carrying indicia visible through a window in different positions of the frame, a slide in said frame and shiftable therein in a direction transverse to the direction in which the frame is shiftable, said frame having a slot therein whereby various portions of said slide may be exposed through certain of said windows, said portions of the slide carrying indicia, a hand piece connected with said slide and extending through said casing, a movable plate on said frame in said casing, a pair of means on said plate and extending out of said casing and mounting said plate for sliding and rocking movements, and said means forming means to slide and rock said plate into various positions to open and close various of said windows.

11. A calculator comprising a casing having a plurality of windows in a wall thereof, a frame within said casing and having a slot therein in the rear of certain of said windows and a series of numerals spaced from said slot and adapted to be presented one at a time before one of said windows, said frame shiftable in said casing to present a desired one of said series of numerals before said window, means for guiding said frame for movement in a given path, a slide in said frame and carrying numbers in predetermined relation and representing operating numerals and results or answers, said slide shiftable in said frame to have a desired operating numeral visible through said slot and one of said certain windows, a plate slidable on said frame in the rear of said wall of the casing, said plate carrying indicia and adapted to be slid to a position to show a problem involving the visible numeral on the frame and the visible operating numeral on the slide, said casing having a plurality of connected slots in a wall thereof, a hand piece on said plate to manipulate the same, and said hand piece adapted after sliding the plate to be passed into a selected one of said slots to expose through one of said certain windows in the wall of the casing and through said slot that one of the said result or answer numbers which is the answer to said problem.

12. In a calculator, a plate having windows therein, a member at the rear of said plate and shiftable with respect thereto, means for guiding said member for movement in a given path, a slide on said member and shiftable relative thereto in a direction transverse to the direction in which the member may be shifted, said member and slide carrying indicia visible through said windows in different positions of the member and slide, and a plate between said member and said first plate and adapted to be shifted to and from positions closing certain of the windows in the latter.

13. A calculator comprising a casing having a plurality of windows in a wall thereof, a member within said casing and carrying a series of numerals, said member shiftable in said casing to present a desired one of said numerals before one of said windows, a slide on said member and carrying numerals in predetermined relation and representing operating numerals and results or answers, said slide shiftable in said member to have a desired operating numeral visible through another of said windows, a plate slidable and rockable on said member in the rear of said wall of the casing, said plate carrying indicia and adapted to be slid to a position to show a problem involving the visible numeral on the member and the visible operating numeral on the slide, and said plate adapted thereafter to be rocked to expose through another of the windows in the wall of the casing one of said result or answer numbers which is the answer to said problem.

14. In a circulator, a plate having windows therein, a member at the rear of said plate and shiftable with respect thereto, means for guiding said member for movement in a given path, a slide on said member and shiftable relative thereto in a direction transverse to the direction in which the member may be shifted, said member and slide carrying indicia visible through said windows in different positions of the member and slide, a plate between said member and said first plate, operating means for the second mentioned plate, said operating means extending through the first mentioned plate, and said operating means manipulatable to shift said second mentioned plate to and from positions closing certain of said windows.

15. In a calculator, a plate having windows therein, a member at the rear of said plate and shiftable with respect thereto, means for guiding said member for movement in a given path, a slide on said member and shiftable relative thereto in a direction transverse to the direction in which the member may be shifted, said member and slide carrying indicia visible through said windows in different positions of the member and slide, a plate between said member and said first plate, operating means for the second mentioned plate, said operating means extending through the first mentioned plate and slidably and rockably mounting the second mentioned plate, and said operating means manipulatable to slide and rock said second mentioned plate to and from positions closing certain of said windows.

16. A calculator comprising a casing having a plurality of windows in a wall thereof, a member within said casing and having a series of numerals adapted to be presented one at a time before one of said windows, said member shiftable in said casing to present a desired one of said series of numerals before said window, a slide on said member and carrying numbers in predetermined relation and representing operating numerals and results or answers, said slide shiftable on said member to have a desired operating numeral visible through one of said windows, a plate slidable on said member in the rear of said wall of the casing, said plate carrying indicia and adapted to be slid to a position to show a problem involving the visible numeral on the member and the visible operating numeral on the slide, said casing having a plurality of connected slots in a wall thereof, a hand piece on said plate to manipulate the same, and said hand piece adapted after sliding the plate to be passed into a selected one of said slots to shift the plate to expose through one of said windows that one of the said result or answer numbers which is the answer to said problem.

JOHN STADLER.